United States Patent

[11] 3,624,519

[72] Inventor William W. Beydler
Laurel, Md.

[21] Appl. No. 875,349
[22] Filed Nov. 10, 1969
[45] Patented Nov. 30, 1971
[73] Assignee Westinghouse Electric Corporation
Pittsburgh, Pa.

[54] TAPPED DELAY LINE TIMING CIRCUIT
7 Claims, 2 Drawing Figs.

[52] U.S. Cl. .................................................... 328/66,
307/208, 307/293, 328/56, 328/63
[51] Int. Cl. .................................................... H03k 1/00,
H03k 5/159
[50] Field of Search ........................................ 307/208,
293; 328/55, 56, 63, 66

[56] References Cited

UNITED STATES PATENTS 3,277,381 10/1966 Sullivan ........................ 328/56
3,418,498 12/1968 Farley .......................... 307/293

OTHER REFERENCES

Pub. I, " Reflex Delay Line Memory Clock," by Dohermann in IBM Tech. Disclosure Bulletin, Vol. 8, No. 1, June 1965, pg. 70

*Primary Examiner*—Stanley D. Miller, Jr.
*Attorneys*—F. H. Henson and E. P. Klipfel

ABSTRACT: A tapped delay line timing circuit for producing timing pulses for a ferrite core memory. The electrical length of the delay line employed is one-quarter that of the total memory cycle time required for a single timing cycle of the memory core for which the timing circuit produces timing pulses. An initiate pulse is utilized to initiate delay line operation and delay line pulses traversing the delay line are recirculated through the delay line. A two-stage, four-state counter is employed to determine the number of times the pulse has been recirculated through the delay line. At the same time, the counter states are used to control the opening and closing of gate devices which select the timing pulses off the delay line.

INVENTOR
WILLIAM W. BEYDLER
By [signature]
Attorney

INVENTOR
WILLIAM W. BEYDLER
By Ernest P. Klipfel
Attorney

TAPPED DELAY LINE TIMING CIRCUIT

BACKGROUND OF THE INVENTION

The present invention relates to timing circuits and more particularly to delay line timing circuits which produce sequential signals for timing the operation of various electronic devices.

While the invention has particular application for generating timing signals for a ferrite core memory and will be hereinafter described for such use, it is to be understood that the present invention may be utilized to generate timing signals for timing the operation of other devices.

It may be explained that, a ferrite core memory operates asynchronously with respect to a computer arithmetic and control unit but the memory internal timing is synchronous within its own cycle. That is, once it receives an initiate command pulse it goes through a definite timing cycle. Memory timing circuits or units provide strobe pulses which determine the widths of various control signals and their relationship within a timing cycle of a memory.

Various methods are presently employed for implementing the timing circuits. One such method used is that of the tapped delay line. In a tapped delay line system, an initiate pulse or a derivative of it is propagated down a tapped delay line whose electrical length is equal to the total memory cycle time and whose tap terminals are spaced at distances equal to the finest resolution desired in the system. The tapped pulses are then used to set and reset flip-flops which control the width of the various signals and their relationship to one another. Individual control signals can be changed simply by changing the tapped point on the delay line. Very good resolution and stability is obtained in such systems, however, for certain applications, such as in aerospace systems, the physical size of the delay line presents a problem.

SUMMARY OF THE INVENTION

In accordance with the principles of the present invention, a timing circuit is provided which has the advantages of high stability, resolution, and ease of change found in prior tapped delay line timing circuits but without the attendant large physical size and cost of an electrically long delay line.

Briefly, a tapped delay line timing circuit comprising a delay line having an input terminal and a plurality of tap terminals disposed along the length thereof is provided by the present invention. An input circuit is provided having an output operable to apply a signal of predetermined time span and defining a delay line pulse to the input terminal of the delay line upon the application of an initiate pulse to the input of the input circuit.

Means including a counting device is operatively coupled to the delay line for iteratively applying delay line pulses traversing the delay line to the input circuit to thereby iteratively operate the input circuit output such that a succession of delay line pulses are produced after the input circuit has been operated by the application of an initiate pulse being applied thereto.

The counting device is responsive to a predetermined number of delay line pulses traversing the delay line to terminate iterative application of delay line pulses to the input circuit such that, after the predetermined number of pulses have traversed the delay line, delay line operation is prevented until another initiate pulse is applied to the input circuit. Finally, means including a plurality of gate devices are provided which are responsive to predetermined ones of the excursions of the delay line pulses along the delay line for producing a succession of timing pulses.

The present invention will become more apparent upon consideration of the following detailed description along with the attached drawings.

DESCRIPTION OF THE PREFERRED EMBODIMENT

Figure 1:
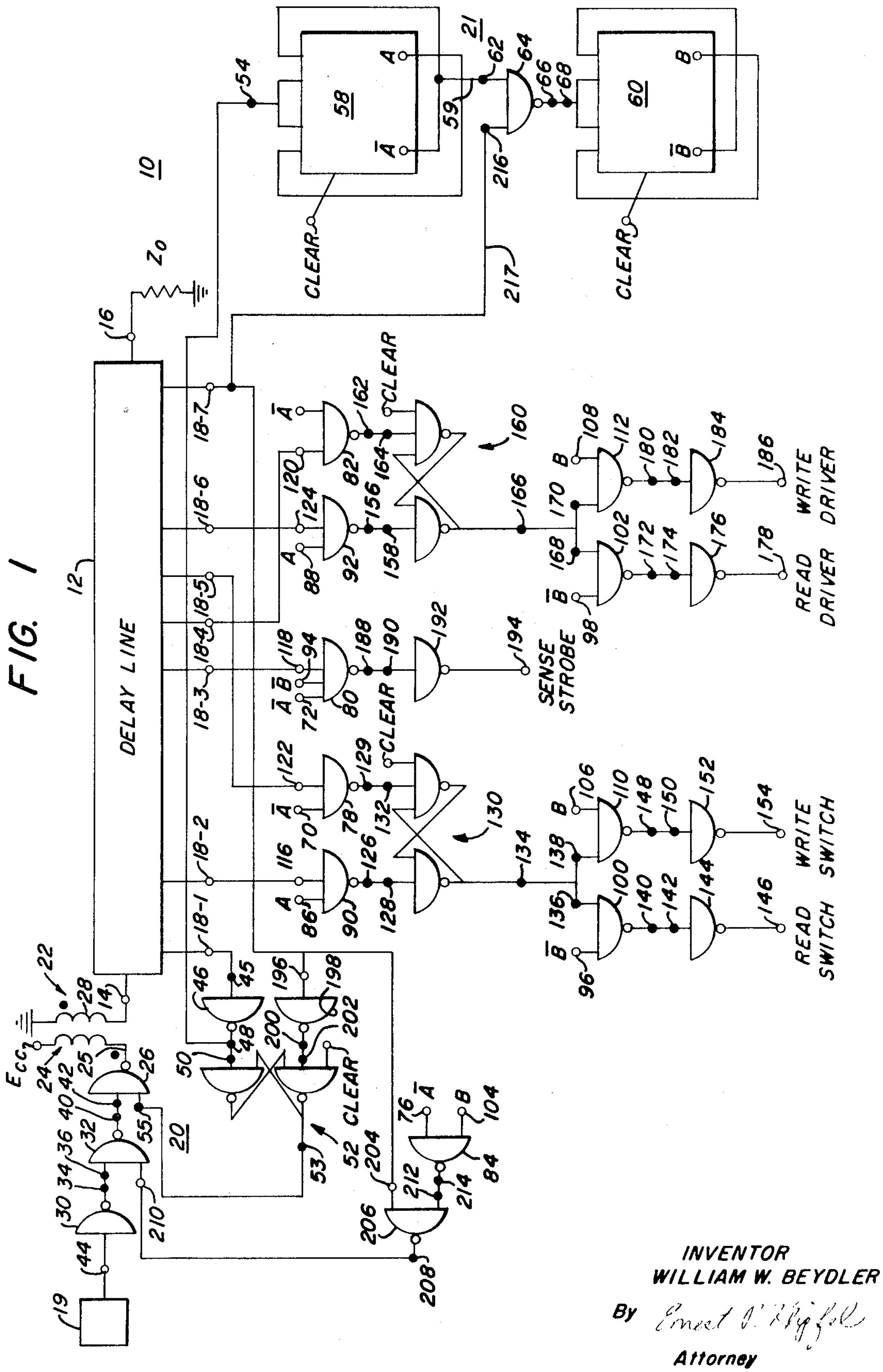
FIG. 1 shows a schematic diagram of a tapped delay line timing circuit arranged in accordance with the principles of the invention.

More specifically, there is shown in FIG. 1 a tapped delay line timing circuit 10 which produces sequential control or timing signals. The circuit 10 will hereinafter be described as a timing circuit to produce a succession of timing signals for use in a coincident current ferrite core memory utilizing a driver-switch-addressing arrangement, however, the timing circuit 10 may be utilized to produce sequential timing signals for use in other electronic devices.

In the following description of the circuit 10, it will be seen that a plurality of NAND logic elements as well as a plurality of flip-flop circuits are employed. Each of the logic elements and each of the flip-flop circuits are conventional and are shown in block form for purposes of simplicity. As is known, NAND logic elements are generally operated with ground states representing logical "zeros" and voltage levels representing logical "ones." In each of the NAND logic elements employed in circuit 10, for any combination of logic "0" inputs, the output of the logic element will be a logical "1," and when all inputs are logical 1 values an inverted output or logical 0 will appear on the output of the logic element.

The circuit 10 includes a tapped delay line 12 having input and output terminals 14 and 16 and intermediate tap terminals 18–1 through 18–7. Fewer or more intermediate tap terminals than the number illustrated can be provided for the delay line 12 if desired. Preferably, the tapped delay line 12 is a lumped parameter delay line formed with a predetermined number of LC sections in the conventional manner. The delay line output terminal 16 is connected to ground through an impedance designated as $Z_o$, which impedance has a value equal to the characteristic impedance of the delay line.

In accordance with the invention, the electrical length of the delay line 12 is chosen to be only one quarter that of the total memory cycle time required for a single timing cycle of the memory core for which the circuit 10 produces timing pulses.

As will appear more fully hereinafter, delay line operation is initiated by the application of a memory initiate signal or a pulse from a source 19. The initiate signal is applied through an input circuit 20, to be described, into the delay line 12. The input circuit 20 has an output operable to apply a logic 1 value signal to the delay line input terminal 14 upon the application of an initiate pulse to the input of input circuit 20. The signal upon reaching tap terminal 18–7 is transmitted through a feedback path for reapplication to the input circuit to iteratively operate the input circuit 20 to a logic 1 value thereby producing a succession of delay line pulses.

During each excursion of the signal through the delay line 12, signals appear successively at tap terminals 18–1 through 18–7 and are applied to input terminals of various NAND circuits or gates. Input terminals of certain of the NAND gates are connected to the outputs terminals of a slow speed, two-stage, four-state counter which is operatively coupled to the delay line and shown generally at 21.

The counter 21 is used to determine the number of times the pulse has been recirculated through the delay line 12 and the decoded counter states are used to control the opening and closing of various NAND circuits which select various timing pulses off the delay line 12. The various timing pulses are made available at the terminals designated "read switch"; "read driver"; "write switch and inhibit"; "sense strobe"; and "write driver." The operation of circuit 10 will hereinafter be described with reference to the waveform and timing diagram of FIG. 2 which illustrates the logical values of the output terminals of the counter stages as well as the timing pulses selected off the delay line.

The input circuit 20 provided for the delay line 12 includes a transformer 22 of conventional design having a primary winding 24 connected at one end to a source of potential designated as $E_{cc}$ and connected at its other end to the output terminal 25 of NAND circuit 26. The secondary winding 28 of transformer 22 is connected at one end to ground and at the other end thereof to input terminal 14 of delay line 12.

A pair of NAND-circuits 30 and 32 are also included in the delay line input circuit 20. The NAND-circuit 30 has an output terminal 34 connected to the input terminal 36 of NAND-circuit 32, and the output terminal 40 of NAND-circuit 32 is connected to the input terminal 42 of NAND-circuit 26. As described above, delay line operation is initiated by the application of a memory initiate signal or pulse from source 19. The initiate pulse is applied at the input terminal 44 of the NAND-circuit 30. The initiate pulse is ultimately applied through transformer 22 at a logical 1 value into the delay line 12. As will appear more fully hereinafter, the initiate signal is conveyed through the delay line 12 and a logic 1 level signal appears successively at the tap terminals 18–1 through 18–7. As the leading edge of the initiate signal appears at the tap terminal 18–1, a feedback signal is applied to the input terminal 45 of a NAND-circuit 46. The output terminal 48 of the NAND-circuit 46 is connected to the input terminal 50 of a one-balf of a conventional flip-flop circuit 52 whose output terminal 53 is connected to the input terminal 55 of NAND-circuit 26. The flip-flop 52 is operative to form a trailing edge for the delay line signal and completes the delay line pulse waveform as will appear more fully hereinafter.

The output terminal 48 of NAND-circuit 46 is also connected to the input terminal 54 of the two-stage, four-state counter 21. The counter 21 is formed of two conventional flip-flop circuits 58 and 60. The output terminals of the flip-flop 58 have been designated by the characters $\overline{A}$, A and the output terminals of the flip-flop 60 have been designated by the characters $\overline{B}$, B.

The output terminal $\overline{A}$ of flip-flop 58 is connected via lead 59 to the input terminal 62 of a NAND-circuit 64 whose output terminal 66 is connected to the input terminal of flip-flop or stage 60.

The output terminal $\overline{A}$ of flip-flop 58 is also connected to the input terminals 70, 72, 74 and 76, respectively, of the NAND-circuits 78, 80, 82 and 84, as denoted by the line signal symbol A appearing over the terminals 70, 72, 74 and 76.

The output terminal A of flip-flop 58 is connected to the input terminals 86 and 88, respectively, of the NAND-circuits 90 and 92, respectively, as denoted by the line signal symbol A appearing over the terminals 86 and 88.

The output terminal $\overline{B}$ of flip-flop 60 is connected to the input terminal 94 of NAND-circuit 80 and to input terminals 96 and 98, respectively, of the NAND-circuits 100 and 102, respectively as denoted by the line signal symbol $\overline{B}$ appearing over the terminals 94, 96 and 98. The output terminal B of flip-flop 60 is connected to the input terminal 104 of the NAND-circuit 84 and to input terminals 106 and 108, respectively, of the NAND-circuits 110 and 112, respectively, as denoted by the line signal symbol B appearing over the terminals 104, 106 and 108.

The tap terminals 18–2 through 18–6 are connected to the input terminals 116, 118, 120, 122, 124, respectively, of the NAND-circuits 90, 80, 82, 78, 92, respectively. The output terminal 126 of NAND-circuit 90 is connected to the input terminal 128 of one-half of a flip-flop 130 and the output terminal 129 of NAND-circuit 78 is connected to the input terminal 132 of the other half of flip-flop 130. The output terminal 134 of flip-flop 130 is connected to the input terminals 136 and 138 of the NAND-circuits 100 and 110, respectively. The output terminal 140 of NAND-circuit 100 is connected to the input terminal 142 of a NAND-circuit 144 whose output terminal 146 is connected to the input of conventional read switch selection circuitry (not shown). The output terminal 148 of NAND-circuit 110 is connected to the input terminal 150 of a NAND-circuit 152 whose output terminal 154 is connected to the input of conventional write switch and inhibit selection circuitry (not shown).

The output terminal 156 of NAND-circuit 92 is connected to the input terminal 158 of one-half of a standard flip-flop 160 and the output terminal 162 of NAND-circuit 82 is connected to the input terminal 164 of the other half of flip-flop 160. The output terminal 166 of flip-flop 160 is connected to the input terminals 168 and 170 of the NAND-circuits 102 and 112, respectively. The output terminal 172 of NAND-circuit 102 is connected to the input terminal 174 of a NAND-circuit 176 whose output terminal 178 is connected to the input of conventional read driver selection circuitry (not shown). The output terminal 180 of NAND-circuit 112 is connected to the input terminal 182 of a conventional NAND-circuit 184 whose output terminal 186 is connected to the input of conventional write driver selection circuitry (not shown).

The output terminal 188 of NAND-circuit 80 is connected to the input terminal 190 of a NAND-circuit 192 whose output terminal 194 is connected to a conventional sense amplifier (not shown).

The tap terminal 18–7 is connected to the input terminal 196 of a conventional NAND-circuit 198 whose output terminal 200 is connected to the input terminal 202 of one-half of the flip-flop 52. The tap terminal 18–7 is also connected to the input terminal 204 of a NAND-circuit 206 whose output terminal 208 is connected to the input terminal 210 of NAND-circuit 32. The input terminal 212 of NAND-circuit 206 is connected to the output terminal 214 of NAND-circuit 84. The tap terminal 18–7 is also connected to the input terminal 216 of NAND-circuit 64 via lead 217.

"Clear" input terminals are provided for the flip-flops 52, 130 and 160 as well as for the stages 58 and 60 of counter 21 as indicated in FIG. 1. Each of the clear input terminals is connected to a pushbutton master clear device (not shown) which, when activated, applies an initial clear pulse of signal at a logical 0 level. When the pushbutton of the master control device is released, each of the clear input terminals reverts to a logical 1 level.

Figure 2:
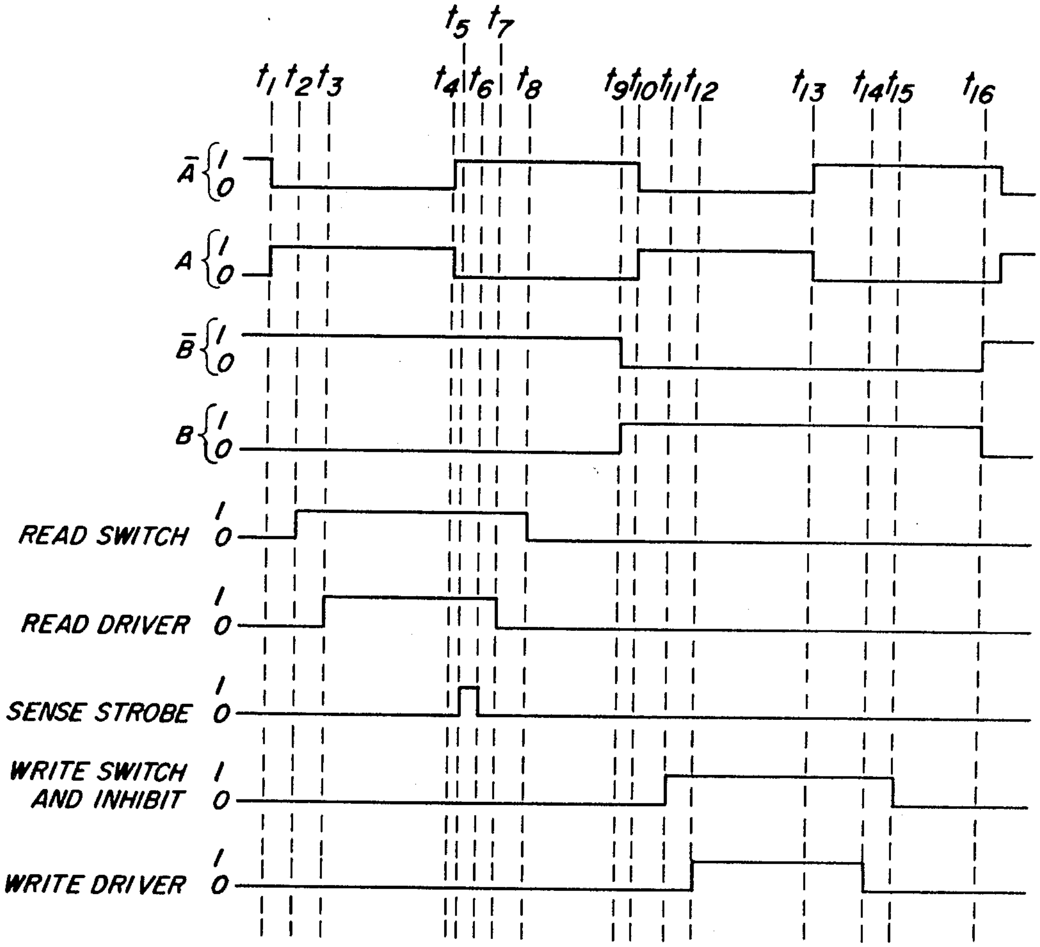
FIG. 2 represents waveforms and timing sequences within the circuit of FIG. 1.

Having thus described the physical components of the timing circuit 10, its operation will now be described with reference to the waveform and timing diagram of FIG. 2.

When the circuit 10 is first energized, an initial clear pulse from the master clear device (not shown) is applied to each of the clear input terminals such that a logical 1 appears on the output terminal 53 of flip-flop 52; a logical 0 appears on the output terminals 134 and 166 of the flip-flops 130 and 160, respectively; a logical 1 and a logical 0, respectively, appear on the output terminals $\overline{A}$, A, respectively, of counter stage 58; and a logical 1 and a logical 0, respectively, appear on the output terminals $\overline{B}$, B, respectively, of counter stage 60. It should also be pointed out that each of the tap terminals of the delay line 12 is initially at logic 0 levels because the input and output terminals 14 and 16, respectively, are connected to ground.

Application of a memory initiate pulse from source 19 to input terminal 44 starts the timing cycle. More specifically, the read portion of the cycle is started. The initiate pulse is applied to terminal 44 at a logic 1 value resulting in a logic 0 value appearing on the output terminal 34 of NAND-gate 30. The logic 0 value on input terminal 36 of NAND-gate 32 enables it resulting in a logic 1 level appearing on the output terminal 42 thereof. The NAND-gate 26 thus has a logic 1 value on its input terminal 42, and by virtue of the fact that the output terminal 53 of flip-flop 52 is at a logic value of 1, a logic 0 level appears on the output terminal 25 of NAND-gate 26. Due to the polarity connection of the transformer 22, a logic 1 signal level appears on the input terminal 14 of the delay 12 and is entered and begins to travel down and delay line. At time $t_1$, the logic 1 signal appears at tap terminal 18-1 and is applied to the input terminal 45 of NAND-gate 46 resulting in a logic 0 level appearing on output terminal 48 of NAND-gate 46. The input terminal 50 of flip-flop 52 thus has a logic 0 level applied thereto which changes the stable-state of flip-flop 52, thereby producing a logic 0 level on its output terminal 53. The input terminal 55 of NAND-gate 26 thus has a logic 0 level applied thereto resulting in a logic 1 level appearing on its output terminal 25. Due to the polarity connection of the transformer 22, a logic 0 signal now appears on the input terminal 14 of the delay line. Thus, the trailing edge of the delay line signal is formed, that is, the logic 1 level applied to the input circuit 20 is reduced to a logic 0 level.

The logic 0 level appearing on output terminal 48 of NAND-gate 46 is also applied to the input terminal 54 of counter stage 58 which changes the state of stage 58 such that a logic 0 level is produced on output terminal $\overline{A}$ and a logic 1 level is produced on output terminal A. This is shown at time $t_1$ in the first and second lines of FIG. 2. The second stage 60 of counter 56, however, remains in its original stable-state with the output terminal $\overline{B}$ at a logic 1 level and terminal B at a logic 0 level as is represented in lines three and four of FIG. 2. This is because input terminal 216 of NAND-gate 64 is at a logic 0 level, as it is connected to tap terminal 18–7, which results in a logic 1 level appearing on its output terminal 66. When output terminal A goes to a logic 1 and applies this level to the input terminal 62 of the NAND-gate 64 there is no change in the logic level on output terminal 66 of NAND-gate 64; it remains at a logic 1 level maintaining stage 60 in its original stable state.

At time $t_2$, the propagating delay line signal appears on tap terminal 18–2 applying a logic 1 level at input terminal 116 of NAND-gate 90 and since, at this time, the output terminal A is at a logic level of 1, a logic 0 level output appears on output terminal 126 of NAND-gate 90 changing the state of flip-flop 130 to its high state, thereby producing a logic 1 level on output terminal 134. The logic 1 level on output terminal 134, together with the logic 1 level appearing on output terminal B, enables NAND-gate 100, thereby producing a logic 0 level on its output terminal 140. The logic 0 level output on terminal 140 of NAND-gate 100 enables NAND-gate 144 producing a logic 1 level on its output terminal 146. Consequently, at time $t_2$ as shown by the waveform in the fifth line of FIG. 2, a read switch pulse is initiated. The logic 1 level on output terminal 134 of flip-flop 130 will effect no change in the condition of NAND-gate 110 since, at this time, the output terminal B is at a logic 0 level. That is, a logic 1 level will remain on the output terminal of NAND-gate 110, thereby resulting in a logic 0 level appearing on the output terminal 154. Consequently, at this time a write switch pulse will not be initiated.

As the pulse continues to travel down the delay line it reaches tap terminal 18–3. However, at this time, as a logic 0 level is appearing on output terminal $\overline{A}$ of the counter 56, no change will be effected in the condition of NAND-gate 80. That is, a logic 1 level will remain on its output terminal 188, thereby resulting in a logic 0 level appearing on the output terminal 194. Consequently, at this time a sense strobe pulse will not be initiated.

Upon further travel of the pulse down the line, it reaches tap terminal 18–4 applying a logic 1 level to the input terminal 120 of NAND-gate 82; however since the logic level on terminal $\overline{A}$ is at a 0 level, no change will be effected in the condition of NAND-gate 82. That is, a logic 1 level will remain on its output terminal 162 and the flip-flop 160 will remain in its low state with a logic 0 level appearing on its output terminal 166.

Upon further travel of the delay line pulse down the delay line, it reaches tap terminal 18–5 applying a logic 1 level to the input terminal 122 of NAND-gate 78; however since, at this time, the output terminal $\overline{A}$ is at a logic level of 0, no change will be effected in the condition of NAND-gate 78. That is, a logic 0 level will remain on output terminal 129 of NAND-gate 78 and the flip-flop 130 will remain in its high state with a logic 1 level appearing on its output terminal 134.

At time $t_3$, the propagating delay line signal appears on tap terminal 18–6 applying a logic 1 level at input terminal 124 of NAND-gate 92 and since, at this time, the output terminal A is at a logic level of 1, a logic 0 level output appears on output terminal 156 of NAND-gate 92 changing the state of flip-flop 160 to its high state, thereby producing a logic 1 level on output terminal 166. The logic 1 level on output terminal 166, together with the logic 1 level appearing on output terminal $\overline{B}$ enables NAND-gate 102 thereby producing a logic 0 level on its output terminal 172. The logic 0 level output on terminal 172 of NAND-gate 102 enables NAND-gate 106 producing a logic 1 level on its output terminal 178. Consequently, at time $t_3$, as shown by the waveform in the sixth line of FIG. 2, a read driver pulse is initiated. The logic 1 level on output terminal 166 of flip-flop 160 will effect no change in the condition of NAND-gate 112 since, at this time, the output terminal B is at a logic 0 level. That is, a logic 1 level will remain on the output terminal of NAND-gate 112, thereby resulting in a logic 0 level appearing on the output terminal 186. Consequently, at this time, a write driver pulse will not be initiated.

Upon further travel of the pulse down the line, it reaches tap terminal 18–7 applying a logic 1 level to the input terminals 216, 196 and 204 of NAND-gates 64, 198 and 206, respectively. The logic 1 level applied to the input terminal 216 effects no change in the condition of NAND-gate 64 as the logic 0 level of terminal $\overline{A}$ applied to input terminal 62 via lead 59 maintains the output terminal 66 of NAND-gate 64 at a logic 1 level. Therefore, the stage 60 remains in its former stable state with the $\overline{B}$ terminal at a logic 1 level and the B terminal at a logic 0 level.

The logic 1 level applied to the input terminal 196 results in a logic 0 level appearing on output terminal 200 of NAND-gate 196. The input terminal 202 of flip-flop 52 thus has a logic 0 level applied thereto which changes the state of flip-flop 52, thereby producing a logic 1 level on its output terminal 53. The input terminal 55 of NAND-gate 26 thus has a logic 1 level applied thereto.

The logic 1 level applied to input terminal 204 of NAND-gate 206 together with the logic 1 level applied to the input terminal 212 of NAND-gate 206 produces a logic 0 level on the output terminal 208 of NAND-gate 206. The logic 1 level appearing on the input terminal 221 of NAND-gate 206 is a result of the logic 0 level of terminal $\overline{A}$ being applied to the input terminal 76 of NAND-gate 84, which, of course, produces a logic 1 level on the output of NAND-gate 84. The input terminal 210 of NAND-gate 32 thus has a logic 0 level applied thereto resulting in a logic 1 level appearing on its output terminal 40 which is, of course, applied to the input terminal 42 of NAND-gate 26. Consequently, both input terminals 42 and 55 of NAND-gate 26 have logic 1 levels applied thereto resulting in a logic 0 level appearing on its output terminal 25. Due to the polarity connection of the transformer 22, a logic 1 signal level appears on input terminal 14 of the delay line and is entered and begins to travel down the delay line. Therefore, a second excursion of the delay line pulse begins.

From the foregoing, the remaining portion of the timing cycle and the specific manner in which the circuit 10 operates will be apparent to those skilled in the art. Accordingly, only a general description of the remaining portion of the cycle will be given. At time $t_4$, the second propagating pulse arrives at tap terminal 18–1 causing the flip-flop 52 to change its state and form the trailing edge of the delay line pulse as was described above with reference to the first excursion of the pulse through the line. Also at time $t_4$, the state of stage 58 of the counter 56 is changed such that a logic 1 level is produced on output terminal $\overline{A}$ and a logic 0 level is produced on output terminal A. This is shown at time $t_4$ in the first and second lines of FIG. 2. As the pulse reaches tap terminal 18–2 no change is effected in the condition of NAND-gate 90. Therefore, flip-flop 130 will remain in its high state with a logic 1 level appearing on its output terminal.

At time $t_5$, the pulse reaches tap terminal 18–3 and produces a logic 1 level on the input terminal 118 of NAND-gate 80 which together with the logic 1 level provided on its other input terminals 72 and 74 due to logic 1 levels now appearing on terminals $\overline{A}$, $\overline{B}$, respectively, of the counter, a logic 0 level is produced on the output terminal 188 of the NAND-gate 80. The logic 0 level appearing on terminal 188 is, of circuit applied to input terminal 190 of NAND-gate 192 resulting in a logic 1 level appearing on the output terminal 194. Consequently, at time $t_5$, a sense strobe pulse is initiated as shown by the waveform in the seventh line of FIG. 2. At time $t_6$, the sense strobe pulse is terminated, this is due to the fact that the trailing edge of the traveling delay line pulse has moved to tap terminal 18–3 which again causes a logic 0 level to be applied to input terminal 118 of NAND-gate 80 which results in a logic 1 level appearing on its output terminal 188 and thus a logic 0 level appearing on the output terminal 194.

At time $t_7$, the pulse reaches tap terminal 18–4 and produces a logic 1 level on the input terminal 120 of NAND-gate 82, which together with the logic 1 level appearing on input terminal 74, produces a logic 0 level on the output terminal 162 of NAND-gate 82 resulting in flip-flop 160 changing to its low level, that is, logic 0 level appearing on its output terminal 166. The logic 0 of terminal 166 applied to the input of NAND-gate 102 results in a logic 1 level appearing on its output terminal 172 and thus a logic 0 level appearing on the terminal 178. Consequently, at time $t_7$, the read driver pulse is terminated as is shown in FIG. 2.

At time $t_8$, the pulse reaches tap terminal 18–5 and produces a logic 1 level on the input terminal 122 of NAND-gate 78, which together with the logic 1 level produced on its other input terminal 70 by output terminal $\overline{A}$ of stage 58, results in a logic 0 level appearing on its output terminal 129. The logic 0 level thus appearing on input terminal 152 results in flip-flop 130 changing to its low level, that is, logic 0 level appearing on its output terminal 134. The logic 0 level of terminal 134 applied to the input terminal 136 of NAND-gate 100 results in a logic 1 level appearing on its output terminal 140 and thus a logic 0 level appearing on the terminal 146. Consequently, at time $t_8$, the read switch pulse is terminated. Upon further travel of the pulse, it reaches tap terminal 18–6, however, no change is effected in the condition of NAND-gate 92. Therefore, flip-flop 160 will remain in its low state with a logic 0 level appearing on its output terminal.

At time $t_9$, the pulse reaches tap terminal 18–7 and is recirculated as above described for entry back into the delay line. Also, at time $t_9$, a logic 1 level is produced on the input terminal 216 of NAND-gate 64 which together with the logic 1 level applied from terminal $\overline{A}$ via lead 59 to input terminal 62 of NAND-gate 64 results in a logic 0 level being produced on the output terminal 66 of NAND-gate 64. The logic 0 level is applied to the input terminal 68 of stage 60 and results in stage 60 changing its state such that a logic 0 level appears on terminal $\overline{B}$ and a logic 1 level appears on terminal B as is shown in FIG. 2.

As the pulse begins its third excursion down the line, the write portion of the cycle is started. The pulse first reaches tap terminal 18–1 which is represented in FIG. 2 at time $t_{10}$, the state of stage 58 is again changed as above described during the first and second excursions of the pulse through the delay line, however, at this time, a logic 0 level appears on output terminal $\overline{A}$ and a logic 1 level appears on output terminal A. The write operation continues in the same manner as the read portion of the cycle as above described. The pulse first reaches tap terminal 18–2 at time $t_{11}$ applying a logic 1 level to NAND-gate 90 which together with the logic 1 level applied to its input terminal 86 results in a logic 0 level appearing on its output terminal 126 which is effective to change the state of flip-flop 130 such that a logic 1 level appears on its output terminal 134. The logic 1 level appearing on output terminal 134 is, of course, applied to the input terminal 138 of NAND-gate 110, which together with the logic 1 level appearing on its input terminal 106 results in a logic 0 level appearing on output terminal 148 of NAND-gate 110. The logic 0 level appearing on terminal 148 is applied to terminal 150 of NAND-gate 152 resulting in a logic 1 level appearing on output terminal 154 as is shown in the eighth line of FIG. 2 at time $t_{11}$.

No further change is effected in the circuit 10 until the pulse reaches tap terminal 18–6 at time $t_{12}$. At time $t_{12}$, a logic 1 level is applied to input terminal 124 of NAND-gate 92 which together with the logic 1 level applied to its input terminal 88 results in a logic 0 level appearing on its output terminal 156 which is effective to change the state of flip-flop 160 such that a logic 1 level appears on its output terminal 166. The logic 1 level appearing on output terminal 166 is applied to the input terminal of NAND-gate 112, which together with the logic 1 level appearing on its input terminal 108 results in a logic 0 level appearing on output terminal 180 of NAND-gate 112. The logic 0 level appearing on terminal 180 is applied to terminal 182 of NAND-gate 184 resulting in a logic 1 level appearing on output terminal 186 as is shown in the ninth line of FIG. 2 at time $t_{12}$.

When the pulse reaches tap terminal 18–7 it is again recirculated to the input of the delay line as above described to begin its fourth excursion down the line.

At time $t_{13}$, it reaches tap terminal 18–1 and again the state of stage 58 is changed such that a logic 1 level appears on terminal $\overline{A}$ and a logic 0 level appears on terminal A.

No further change is effected in the fourth excursion of the pulse until the pulse reaches tap terminal 18–4 at time $t_{14}$. At time $t_{14}$, a logic 1 level appears on the input terminal 120 of NAND-gate 82, which together with the logic 1 level appearing on input terminal 74, produces a logic 0 level on the output terminal 162 of NAND-gate 82 resulting in flip-flop 160 changing to its low level with a logic 0 level appearing on its output terminal 166. The logic 0 level of terminal 166 applied to the input of NAND-gate 112 results in a logic 1 level appearing on its output terminal 180 and thus a logic 0 level appearing on the terminal 180 and thus a logic 0 level appearing on the terminal 186 of NAND-gate 184. Consequently, at time $t_{14}$, the writer driver pulse is terminated as is shown in FIG. 2.

At time $t_{15}$ , the pulse reaches tap terminal 18–5 and produces a logic 1 level on the input terminal 122 of NAND-gate 78, which together with the logic 1 level produced on its other input terminal 70 by output terminal $\overline{A}$ of stage 58, results in a logic 0 level appearing on its output terminal 129. The logic 0 level thus appearing on input terminal 152 results in flip-flop 130 changing to its low level with a logic 0 level appearing on its output terminal 134. The logic 0 level of terminal 134 applied to the input terminal 138 of NAND-gate 110 results in a logic 1 level appearing on its output terminal 148 and thus a logic 0 level appearing on the output terminal 154 of NAND-gate 152. Consequently, at time $t_{15}$, the write switch and inhibit pulse is terminated.

As the pulse continues down the line it next reaches tap terminal 18–6, however, no change is effected in the condition of NAND-gate 92. Therefore, flip-flop 160 will remain in its low state with a logic 0 level appearing on its output terminal.

The pulse then reaches tap terminal 18–7 at time $t_{16}$, however, further recirculation of the pulse is prevented due to the fact that the input terminals 76 and 104 of NAND-gate 84 both have logic 1 levels appearing thereon after time $t_{13}$ which causes NAND-gate 84 to have a logic 0 level appear on its output terminal 214 which, in turn, prevents the arrival of a logic 1 level on the input terminal 204 of NAND-gate 206 to have any effect thereon. Therefore, the input terminal 14 of the delay line 12 will remain at a logic 0 level. pg,23

Also, as is shown at time $t_{16}$, with the arrival of the pulse at tap terminal 18–7, the state of stage 60 of counter 56 is changed to its high level with a logic 1 level appearing on output terminal $\overline{B}$ and a logic 0 level appearing on output terminal B. Thus, both stages of the counter 56 are now in the condition in which they were in at the beginning of the timing cycle just described. Therefore, upon arrival of another memory initiate pulse, the timing cycle will repeat itself.

The foregoing description has been presented only to present the principles of the invention. Accordingly, it is desired that the invention be not limited by the embodiment described, but, rather, that it be accorded an interpretation consistent with the scope and spirit of its broad principles.

In particular, those skilled in the art will perceive that by suitable modification of the circuitry, it will be possible to build delay lines that are shorter or longer in comparison with a conventional delay line. It will be understood that the invention consists in supplying a delay line **1/*N*** as long as a conventional delay line, with $N$ being an integer from about 2 to 10, and in supplying also the necessary means including a counter whereby the produced pulses are released for utilization only after the initiate pulse has traversed the delay line $N$ times. In the example given above, $N$ was 4, which is about the optimum. When $N$ is only 2 or 3, the saving in delay line length is not as great, and when $N$ becomes as high as 10, the bulk and/or complexity of the switching and counting system becomes so great as to counterbalance the diminishing savings obtainable by shortening the delay line further.

I claim as my invention:

1. A tapped delay line timing circuit comprising
   a delay line having an input terminal and a plurality of tap terminals disposed along the length thereof,
   an input circuit having an output operable to apply a signal of a predetermined time span and defining a delay line pulse to said delay line input terminal upon the application of an initiate pulse to the input of said input circuit,
   means including a counting device operatively coupled to at least one of said delay line tap terminals for iteratively applying delay line pulses traversing said delay line to said input circuit when each of said pulses has traveled to said one tap terminal to thereby iteratively operate said input circuit output such that a succession of delay line pulses is produced after said input circuit has been operated by the application of an initiate pulse thereto,
   said counting device being responsive to a predetermined number of delay line pulses traversing said delay line to terminate iterative application of said delay line pulses to said input circuit such that after said predetermined number of pulses have traversed said delay line, delay line operation is prevented until another initiate pulse is applied to said input circuit, and
   means including a plurality of gate devices each operatively connected to predetermined ones of said tap terminals and being responsive to predetermined ones of the excursions of said delay line pulses along said line for producing a succession of timing pulses.

2. A tapped delay line timing circuit as set forth in claim 1 wherein said delay line has an input and an output terminal and said plurality of tap terminals are disposed at predetermined line locations intermediate said input and output terminals of said delay line.

3. A tapped delay line timing circuit as set forth in claim 2 wherein the output of said input circuit is operable to apply a logic 1 value signal to the delay line input terminal upon the application of an initiate pulse to the input of said input circuit.

4. A tapped delay line timing circuit as set forth in claim 3 wherein means are provided for coupling at least one other of said delay line tap terminals to said input circuit for reducing the output of said input circuit to a logic 0 value after the input circuit output has been operated to apply a logic 1 value signal to said delay line input terminal and the signal has traveled to said one other tap terminal thereby producing said delay line pulse of predetermined time span.

5. A tapped delay line timing circuit as set forth in claim 4 wherein said counting device is operatively connected to at least the first tap terminal of said delay line such that said counting means is operable to start counting when said logic 1 value signal arrives at said first tap terminal.

6. A tapped delay line timing circuit comprising
   a delay line having input and output terminals and a plurality of tap terminals disposed at predetermined intermediate line locations,
   an input circuit having an output operable to apply a logic 1 value signal to the delay line input terminal upon the application of an initiate pulse to the input of said input circuit,
   means operatively coupled to the first delay line tap terminal for reducing the output of said input circuit to a logic 0 value after the input circuit has been operated to apply a logic 1 value signal to the delay line input terminal and the signal has traveled to said first tap terminal thereby producing a delay line pulse with a predetermined span,
   means including a counting device operatively coupled to the last delay line tap terminal for iteratively applying the logic 1 value signal to the input circuit when the logic 1 value signal has traveled to said last terminal to iteratively operate the input circuit output to a logic 1 value thereby producing a succession of delay line pulses,
   said counting device being arranged to start counting when the first delay line pulse has traveled to said first tap terminal and to count the number of pulses that have traversed the delay line, said counting device being responsive to a predetermined number of delay line pulses traversing the delay line to terminate iterative application of the delay line pulses to the input circuit such that delay line operation is prevented until another initiate pulse is applied to the input circuit, and
   means operatively connected to the tap terminals disposed between said first and last tap terminals and being responsive to predetermined ones of the excursions of said delay line pulses along said delay line for producing a succession of timing pulses.

7. The method that comprises,
   providing an initiate pulse to a delay line having a plurality of taps,
   causing said pulse to be propagated iteratively $N$ times through said delay line, $N$ being an integer between 2 and 10,
   counting by means of an $N$-state counter the number of excursions through said delay line that have been made by said pulse, and
   operating logic circuit elements associated with said taps in accordance with changes in state of said counter, whereby tapped delay line timing is obtained with the use of a delay line having a length $1/N$ of that required when using a delay line in which pulse recirculation is not practiced.

* * * * *